US009430353B2

(12) United States Patent
Shafi

(10) Patent No.: US 9,430,353 B2
(45) Date of Patent: Aug. 30, 2016

(54) ANALYSIS AND VISUALIZATION OF CONCURRENT THREAD EXECUTION ON PROCESSOR CORES

(75) Inventor: Hazim Shafi, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 972 days.

(21) Appl. No.: 12/605,947

(22) Filed: Oct. 26, 2009

(65) Prior Publication Data

US 2011/0099550 A1    Apr. 28, 2011

(51) Int. Cl.
| G06F 9/46 | (2006.01) |
| G06F 11/32 | (2006.01) |
| G06F 11/30 | (2006.01) |
| G06F 11/34 | (2006.01) |

(52) U.S. Cl.
CPC .......... *G06F 11/323* (2013.01); *G06F 11/3058* (2013.01); *G06F 11/3466* (2013.01)

(58) Field of Classification Search
None
See application file for complete search history.

(56) References Cited

U.S. PATENT DOCUMENTS

| 5,168,554 | A | 12/1992 | Luke |
| 5,297,274 | A | 3/1994 | Jackson |
| 5,903,730 | A | 5/1999 | Asai et al. |
| 6,057,839 | A | 5/2000 | Advani et al. |
| 6,226,787 | B1 | 5/2001 | Serra et al. |
| 6,289,369 | B1 | 9/2001 | Sundaresan |
| 6,332,212 | B1 * | 12/2001 | Organ et al. ................ 717/128 |
| 6,341,347 | B1 * | 1/2002 | Joy et al. ................... 712/228 |
| 7,137,120 | B2 | 11/2006 | Armstrong et al. |
| 7,343,476 | B2 | 3/2008 | Floyd et al. |
| 7,353,370 | B2 | 4/2008 | Rodgers et al. |
| 7,426,731 | B2 | 9/2008 | Findeisen |
| 7,610,186 | B2 | 10/2009 | Odhner et al. |
| 8,418,148 | B2 | 4/2013 | Shafi et al. |
| 8,990,551 | B2 | 3/2015 | Shafi |
| 2002/0152305 | A1 | 10/2002 | Jackson et al. |
| 2003/0187929 | A1 | 10/2003 | Pugh et al. |
| 2004/0210900 | A1* | 10/2004 | Jones et al. ................ 718/100 |
| 2005/0104799 | A1 | 5/2005 | Shimizu |
| 2006/0095917 | A1 | 5/2006 | Black-Ziegelbein et al. |
| 2007/0220513 | A1 | 9/2007 | Hwang |
| 2007/0250820 | A1 | 10/2007 | Edwards et al. |
| 2007/0294693 | A1 | 12/2007 | Barham |
| 2008/0098207 | A1 | 4/2008 | Reid et al. |
| 2008/0189488 | A1 | 8/2008 | DeWitt et al. |

(Continued)

OTHER PUBLICATIONS

Visual Studio 2010 CTP Walkthroughs Sep. 2008.*

(Continued)

*Primary Examiner* — Mengyao Zhe
(74) *Attorney, Agent, or Firm* — Kevin Sullivan; Micky Minhas

(57) ABSTRACT

An analysis and visualization is used to depict how a concurrent application executes threads on processor cores over time. With the analysis and visualization, a developer can readily identify thread migrations and thread affinity bugs that can degrade performance of the concurrent application. An example receives information regarding processes or threads running during a selected period of time. The information is processed to determine which processor cores are executing which threads over the selected period of time. The information is analyzed and executing threads for each core are depicted as channel segments over time, and can be presented in a graphical display. The visualization can help a developer identify areas of code that can be modified to avoid thread migration or to reduce thread affinity bugs to improve processor performance of concurrent applications.

20 Claims, 3 Drawing Sheets

(56) References Cited

U.S. PATENT DOCUMENTS

| | | |
|---|---|---|
| 2009/0063885 A1 | 3/2009 | Arimilli et al. |
| 2009/0089790 A1 | 4/2009 | Manczak et al. |
| 2009/0237404 A1 | 9/2009 | Cannon, III |
| 2009/0313633 A1 | 12/2009 | Nardelli et al. |
| 2009/0319996 A1 | 12/2009 | Shafi et al. |
| 2010/0223600 A1 | 9/2010 | Shafi et al. |
| 2011/0099554 A1 | 4/2011 | Shafi |
| 2012/0072758 A1 | 3/2012 | Shafi |

OTHER PUBLICATIONS

"IBM Toolkit for Data Collection and Visual Analysis for Multi-Core Systems", Retrieved at Oct. 2, 2008, pp. 1-2.

Matassa, et al., "Best Practices: Adoption of Symmetric Multiprocessing Using VxWorks and Intel Multi-Core Processors", Retrieved at Feb. 2009, pp. 1-20.

Waddington, et al., "Dynamic Analysis and Profiling of Multithreaded Systems", Retrieved at 2007, pp. 1-32.

Ma, et al., "Delta Execution: A Preemptive Java Thread Migration Mechanism", Retrieved at 2000,vol. 3, Issue 2, pp. 83-94.

"Visualization Tools Aid Multi-Core Development", Retrieved at Jun. 5, 2007, pp. 1-2.

Shafi, Hazim, "Performance Pattern 2: Disk I/O", Retrieved at Sep. 22, 2009, pp. 1-18.

"Visual Studio 2010 Beta 1: Parallel Performance Tools Overview", retrieved at <blogs.msdn.com/hshafi/archive/2009/05/18/visual-studio-2010-beta-1-parallel-performance-tools.aspx>>, May 18, 2009, pp. 5.

Graham, Bill, "Software Visualization Tools to Optimize Multi-core Systems", <embedded-control-europe.com/c_ece_knowhow/874/ECEfeb07p21.pdf>>, Feb. 2007, pp. 3.

"Taking Parallelism Mainstream", retrieved at <download.microsoft.com/download/D/5/9/D597F62A-0BEE-4CE7-965B-099D705CFAEE/Taking%20Parallelism%20Mainstream%20Microsoft%20February%202009.docx>>, Oct. 9, 2008, pp. 21.

Health, et al., "ParaGraph: A Tool for Visualizing Performance of Parallel Programs", retrieved at <netlib.org/paragraph/manual.ps.>>, Sep. 1, 1994, pp. 50.

Graham, et al., "Evaluation of a Prototype Visualization for Distributed Simulations", retrieved at <informs-sim.org/wsc98papers/200.PDF>>, Proceedings of the 1998 Winter Simulation Conference, 1998, pp. 9.

Godin, et al., "Parallel Performance Visualization Using Moments of Utilization Data", retrieved at <pdps.cc.gatech.edu/1998/papers/198.pdf>>, Jun. 22, 2000, pp. 1-6.

"Parallel Performance Analysis, Visualization and Optimization" retrieved at <<charm.cs.uiuc.edu/research/parallel_perf/>>, Sep. 18, 2009, pp. 4.

Final Office Action for U.S. Appl. No. 12/605,932 mailed Aug. 8, 2013 (9 pgs.).

Office Action for U.S. Appl. No. 12/605,932 mailed Mar. 27, 2014 (11 pgs.).

Final Office Action for U.S. Appl. No. 12/605,932 mailed Sep. 18, 2014 (11 pgs.).

"ThreadX", retrieved at <tos.com/page/product.php?id=2 >>, pp. 6.

"Graphical Thread Dumps", retrieved at <neuroning.com/articles/2005/11/24/graphical-thread-dumps>>, Nov. 25, 2005, pp. 3.

Office Action for U.S. Appl. No. 12/394,445 mailed Jan. 20, 2012 (12 pgs.).

Final Office Action for U.S. Appl. No. 12/394,445 mailed Jul. 13, 2012 (12 pgs.).

Notice of Allowance for U.S. Appl. No. 12/394,445 mailed Nov. 27, 2012 (11 pgs.).

Aron, et al., "Cluster Reserves: A Mechanism for Resource Management in Cluster-based Network Servers", Retrieved at <citeseerx.ist.psu.edu/viewdoc/download?doi=10.1.1.92.917&rep=rep1&type=pdf >>, Proceedings of the ACM Sigmetrics 2000 International Conference on Measurement and Modeling of the Computer Systems, Jun. 2000, pp. 12.

Medernach, Emmanuel, "Workload analysis of a cluster in a Grid environment", Retrieved at <<arxiv.org/PS_cache/physics/pdf/0506/0506176v1.pdf , Feb. 2, 2008, pp. 1-19.

Office Action for U.S. Appl. No. 12/883,859 mailed Apr. 23, 2013 (11 pgs.).

Hazim Shall, "Visual Studio 2010 Beta 1: Parallel Performance Tools Overview", May 18, 2009.

Office Action for U.S. Appl. No. 12/883,859 mailed Oct. 29, 2013 (15 pgs.).

Final Office Action for U.S. Appl. No. 12/883,859 mailed May 15, 2014 (8 pgs.).

Office Action for U.S. Appl. No. 12/605,932 mailed May 22, 2012 (12 pgs.).

Office Action for U.S. Appl. No. 12/605,932 mailed Feb. 1, 2013 (9 pgs.).

Notice of Allowance for U.S. Appl. No. 12/883,859 mailed Nov. 7, 2014 (17 pgs.).

Office Action for U.S. Appl. No. 12/605,932 mailed Jun. 6, 2015 (20 pgs.).

Final Office Action for U.S. Appl. No. 12/605,932 mailed Jan. 5, 2016 (15 pgs.).

* cited by examiner

ANALYSIS AND VISUALIZATION OF CONCURRENT THREAD EXECUTION ON PROCESSOR CORES

BACKGROUND

Computer applications having concurrent threads executed on multiple processors present great promise for increased performance but also present great challenges to developers. The growth of raw sequential processing power has flattened as processor manufacturers have reached roadblocks in providing significant increases to processor clock frequency. Processors continue to evolve, but the current focus for improving processor power is to provide multiple processor cores on a single die to increase processor throughput. Sequential applications, which have previously benefited from increased clock speed, obtain significantly less scaling as the number of processor cores increase. In order to take advantage of multiple core systems, concurrent (or parallel) applications are written to include concurrent threads distributed over the cores. Parallelizing applications, however, is challenging in that many common tools, techniques, programming languages, frameworks, and even the developers themselves, are adapted to create sequential programs.

Optimizing parallel performance can be time consuming, difficult, and error-prone because there are so many independent factors to track. One set of factors involves scheduling priorities and how thread mapping affects system performance. A scheduler controls multitasking with scheduling priorities algorithms to determine how threads receive processor time slices. At times, a thread executing on one processor core can be stopped, moved to another core, and continued. Each thread has access to memory in order to load instructions to execute, to load saved data to read, or save produced data to write. Data and instructions are usually stored in one or more caches accessible to the processor core to reduce memory latency. This set of data and instructions used by the thread to execute in a certain window of time is often referred to as the thread's working set. Moving a thread to a different core may require the thread to reload its working set from memory or other caches, resulting in significant performance penalties. Tools intended for sequential applications provide no information on how concurrent threads are scheduled on processor cores and provide no meaningful insight on scheduling effects of concurrent threads. Understanding the behavior of concurrent threads in parallel applications and their interactions with the processing resources of a computing device is a challenge with the current developer tools.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to an analysis and visualization that depicts how a concurrent application is executing threads in processor cores over time. With the analysis and visualization, a developer can readily identify significant thread migrations and thread affinity bugs that can degrade performance of the concurrent application. An example of the disclosure receives information regarding processes or threads of the concurrent application running during a selected period of time. The information is processed to determine which processor cores are executing which threads during the selected period of time. The information is analyzed and depicted as a channel segment for each core over time, and can be presented in a graphical display. The visualization can help a developer identify areas of code in the concurrent application that can be modified to avoid significant thread migration or to reduce thread affinity bugs. The analysis and visualization can be implemented as a method, a software product, or as a system.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
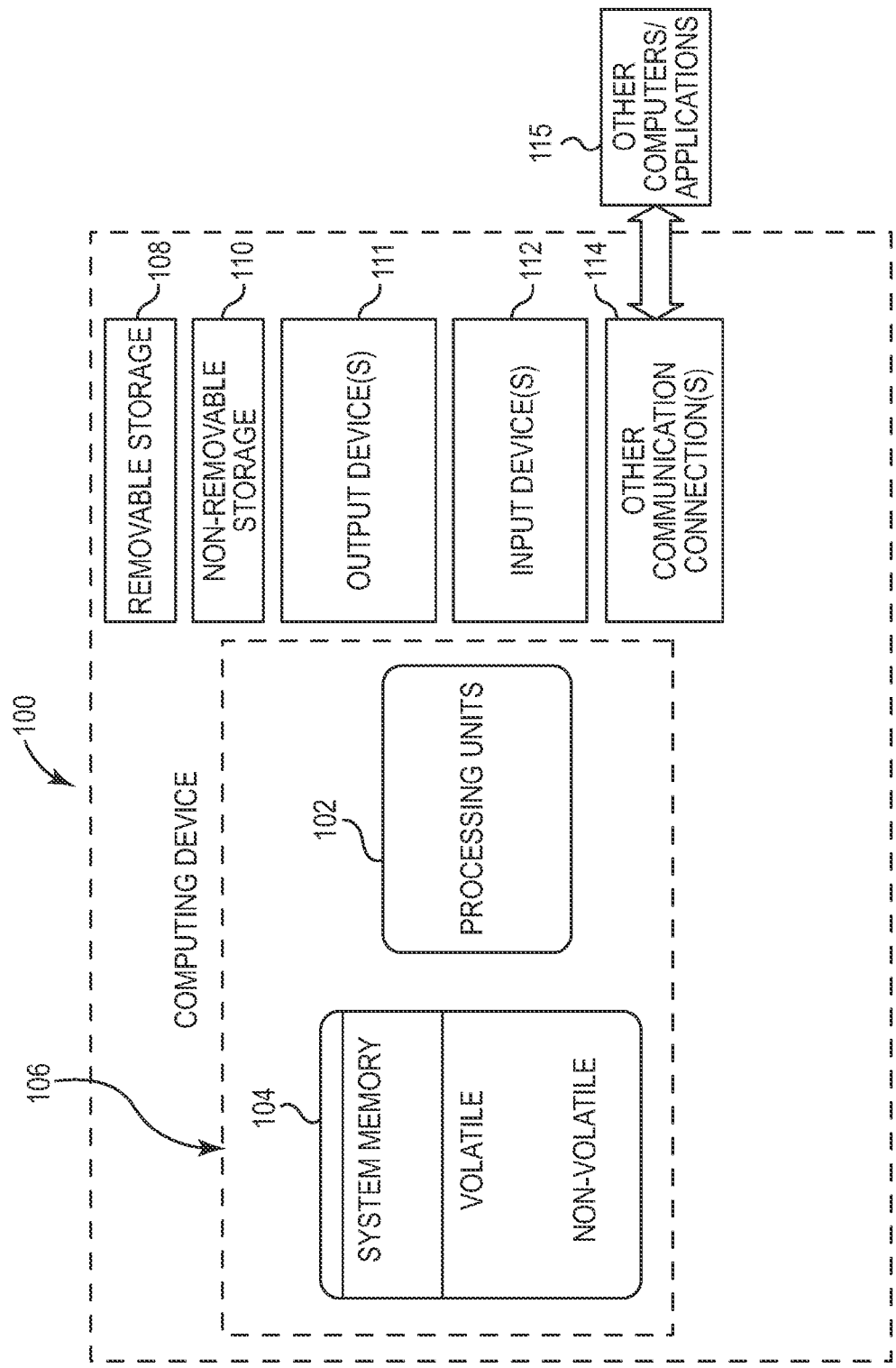
FIG. 1 is a block diagram illustrating an example computing device.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable)

including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a unique thread identifier, and a thread context (or thread state) until the thread is scheduled. A thread context includes the thread's set of machine registers, the kernel stack, a thread environmental block, and a user stack in the address space of the process corresponding with the thread. In parallel applications, threads can be concurrently executed on the processor 102.

Figure 2:
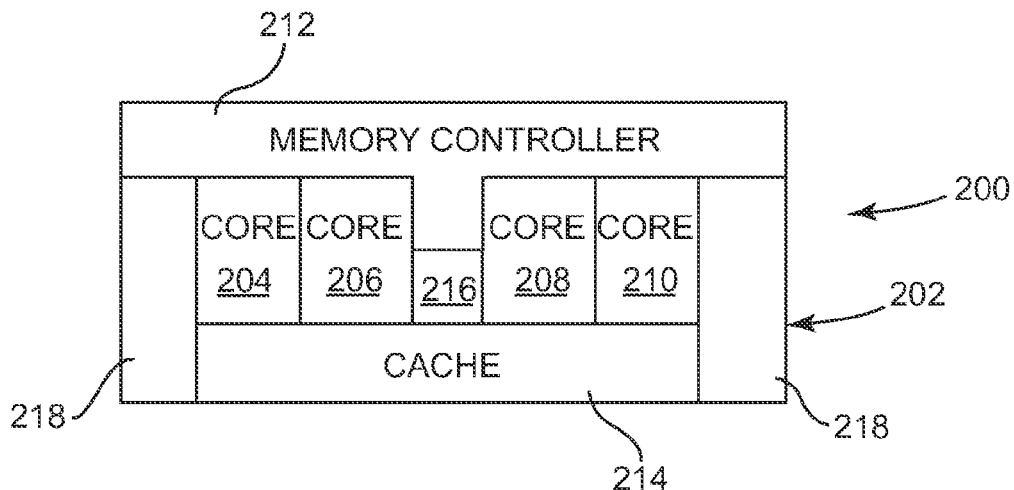
FIG. 2 is a schematic diagram illustrating an example of a multiple core processing system of the computing device of FIG. 1.

FIG. 2 an example multiple core processor 200 that can be implemented in the computing device 100 as processor 102 to concurrently execute threads. This example includes multiple cores implemented on a single die 202. Other examples are contemplated where a multiple core processor 200 exists on separate chips or even separate computer system, and the like. The example of FIG. 2 includes four physical processor cores 204, 206, 208, 210, or simply four physical cores, where each of the physical cores is available to process at least one application thread concurrently with at least one other physical core processing another thread. The physical cores 204, 206, 208, 210, are adjacent to a memory controller 212 and a cache 214 on the die 202 as shown. Each of the cores is associated with a cache hierarchy. In one example, the architecture of processor 102 includes cache in the physical core 204, 206, 208, 210 (such as L1 and L2 cache), an L3 cache in cache 214, memory 104 served by memory controller 212, and so on. In the example die 202, a queue 216 is disposed the die between the memory controller 212 and the cache 214. The die 202 can include other features 218 or combination of features such as a memory interfaces, miscellaneous input/output blocks, proprietary interconnects, expansion card interfaces, and the like. The illustrated configuration is representative of chip including processors currently available under the designation "Nehalem" available from Intel Corp. of Santa Clara, Calif., U.S.A.

Each physical core may be capable of efficiently and concurrently executing multiple threads of a concurrent process. Such physical cores are often referred to as "Simultaneous Multi-Threading," or simply "SMT," cores, and the concurrently executed threads on each physical core share hardware resources included within the single physical core. In the example of the multiple core processing system 200, each physical core is capable of multithreading. Multithreading technology aims to increase core efficiency through thread-level and instruction-level parallelism. Each physical core capable of multithreading, or the like, can present the operating system with as many logical cores as concurrently executing threads it supports. In the example multiple core processing system 200, each physical core 204, 206, 208, 210 is capable of concurrently executing two threads, and thus provides the operating system with eight concurrent logical cores. The computing device 100 can theoretically execute as many concurrent threads as there are logical cores in the device 100.

In some examples, the processor 102 can be included as part of multiple processor architectures depending performance considerations. In a non-uniform memory access (NUMA) architecture, for example, a set of concurrent processors 102 are arranged into smaller operating units called nodes. Each node can have its own logical core and memory, which includes caches, and is connected to the larger system through a cache-coherent interconnect bus (not shown). NUMA systems can increase processor speed without increasing the load on the processor bus as compared to symmetric multiprocessing (SMP) systems. The NUMA architecture is non-uniform because each processor in the NUMA architecture is close to some parts of memory and farther from other parts of memory (i.e., non-equidistant). (Distance is a metric often measured by hops, bandwidth, latency, or the like.) In multiple core processor 200, the logical cores quickly gain access to the memory they are close to, while memory that is farther away is accessed less quickly.

A scheduler controls processor multitasking by determining which of the competing threads in a concurrent application receives the next processor time slice as well as assigning the threads to a logical core. Schedulers can be included in the system platform, and examples can include a system scheduler, a lightweight scheduling mechanism, and others. The scheduler determines the order and assigns a logical core the threads run on using scheduling priorities. In one example, the scheduler is included with the operating system. Each concurrent thread execution that is supported by a processor core can be referred to as a "logical core" because the scheduler treats it as an independent processor core.

One aspect of scheduling is thread migration. Migration in general is the process of moving work, such as the thread, from one logical core to another and can be used to solve problems in parallel computing. For example, migration can be used to improve load balance, by migrating work away from overloaded logical cores. Migration can improve communication performance, by moving pieces of work that communicate with each other closer together. Migration can allow all the work to be moved off a logical core to allow another job to run there, or to vacate a node that is expected to fail or be shut down.

In some circumstances, thread migration can be detrimental to processor performance. A thread that migrates from one logical core to another can cause degradation in performance due to the resultant memory latency and bandwidth required to move the corresponding working set across cores or possibly across processors. Another contributing factor in detrimental processor performance includes the distance the working set is moved. A working set that is moved a relatively large distance will incur longer latencies than if the working set is moved a relatively short distance.

Detrimental thread migration can be reduced at times through enforced thread affinity. Thread affinity serves to schedule a thread to run on a specific processor or subset of processors, but it is often avoided because it can interfere with the scheduler's ability to schedule threads effectively across processors. Thread affinity can also decrease the performance gains produced by parallel processing. Accordingly, a developer is often faced with the challenge of finding a proper balance between beneficial and detrimental effects of migration and affinity.

Figure 3:
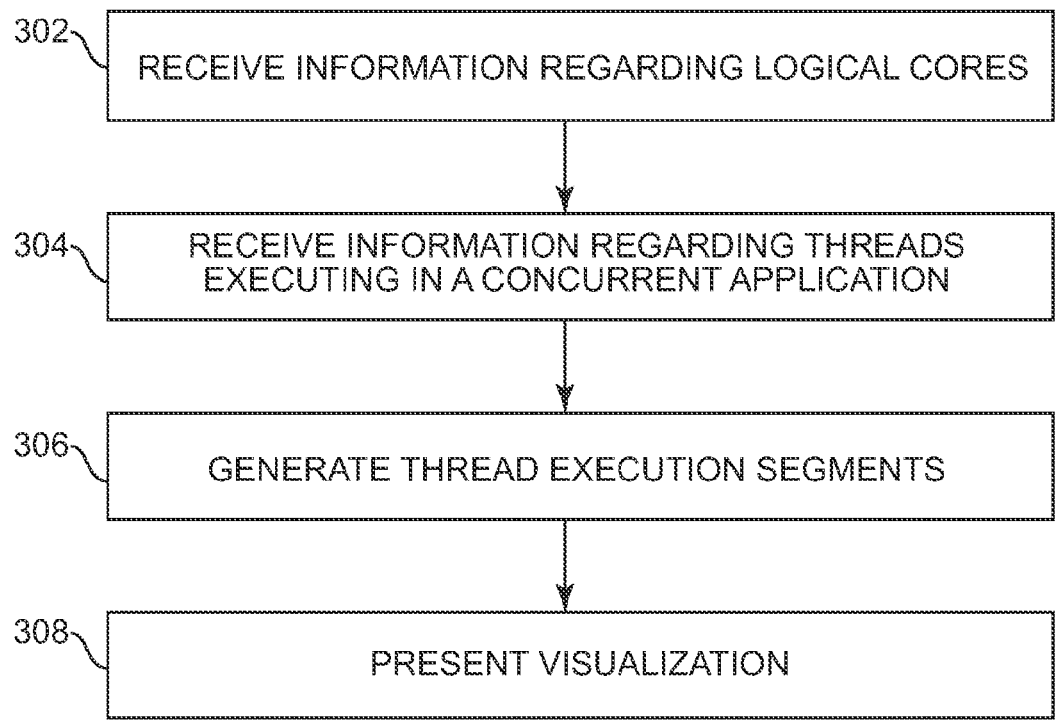
FIG. 3 is a block diagram illustrating an example method of visualization used with the multiple core processing system of FIG. 2.

FIG. 3 illustrates an example method 300 that can help a developer of a concurrent application recognize significant thread migration and identify thread affinity bugs with an analysis of parallel performance during execution of the concurrent application on the multiple core processing system 200. Information regarding the available logical cores in the multiple core processing system 200 is received at 302. In one example, the operating system interrogates the hardware to determine the number of logical cores available in a multiple core processing system. This information regarding the available logical cores received at 302 can also include information on the architecture of the processor. For example, the information on the architecture can include information about which logical cores share a single physical core and similarly, which physical cores share the same processor socket in hardware, or the like. Information regarding execution of threads in the concurrent application is received into the method at 304. The information received in 302 and 304 is processed to generate thread execution segments that associate threads over the course of time to logical cores at 306. The thread execution segments indicate which threads are executing on which logical cores and when during the selected course of time. Thread execution segments for each of the logical cores over the course of time is presented to the developer as a visualization at 308. In one example, this visualization can include a graphical display. The visualization can be used for many purposes such as to determine thread migration and thread affinity bugs. Once known, the developer can make educated modifications to the concurrent application to avoid detrimental performance as a result of inefficient scheduling.

Method 300 can be implemented as a tool to be run on the computing device 100. In one example, the tool is a software program or part of a software package. The software program can be included in a computer readable storage medium storing computer executable instructions for controlling a computing device, such as computing device 100, to perform the method 300. In one example, the tool can be a part of an integrated development environment, or IDE. The IDE can include a code editor, a compiler, build tools, a debugger and other tools for developing and testing an application. An example of an IDE is available under the trade designation "Visual Studio" from Microsoft Corp. of Redmond, Wash., U.S.A. The software program can also be a separate product that can be used with one or more IDE packages or as a stand-alone product.

Information regarding the threads or processes executing on the logical cores can be determined through analyzing context switches in one example of 304. A context switch is a process of storing and restoring the state (context) of the multiple core processor 200 such that multiple processes or threads can share a single resource or operate concurrently. The context switch can be included as a feature of a multitasking operating system operating on the multiple core processor 200. A context switch can include a register context switch, a task context switch, a thread context switch, or a process context switch and is determined with the processor and the operating system. In the present example, a thread context switch is used.

A high-speed tracing facility can be used to generate context switch events. In one example, tracing is provided by the operating system running on the multiple core processor 200, although other methods of receiving context switch events are possible. In the present example, a trace can be enabled for a duration of time as part of 304, and each context switch event can be recorded as a context switch record. One example of a tracing mechanism is designated as "Event Tracing for Windows," or "ETW," which is included in many operating systems available from Microsoft Corp.

In one example, a context switch record includes a timestamp, process identifier, a thread identifier for both the thread that is being removed and the thread that is being scheduled, a logical core identifier associated with the context switch operation, and data as to whether the thread is stopping or starting execution, among other information. The context switch record can be filtered to let pass only information regarding the concurrent application of interest.

The context switch data generated in the trace is processed and analyzed to determine relevant times of execution for each thread and the logical core or cores used to execute each thread at 306. In the example, the method 300 creates channel segments for each thread with the received context switch data. Each channel segment depicts the start and stop time of the corresponding thread as well as if and when the thread is paused and resumed in the case of migration or otherwise. Each channel segment also depicts which logical core is executing the thread and, in the case of a thread migrating to another core, which logical cores are executing the thread and when.

Based on information received from the hardware, the channel segments can also depict relative distances, or proximity, of an executing thread to the cache hierarchy of another logical core. Relative distances can be depicted in a number of ways such as through grouping of channel segments, indication of distance in a legend, graphical illustration, and other depictions. The depiction of relative distances is particularly helpful for systems where logical cores are not equidistant to each other's cache hierarchy, such as in some processor 102 and in NUMA architectures. The relative distances of the other logical cores can be used to determine effects of thread migration. For example, a thread migrating to a proximate logical core might provide beneficial effects to processor performance based on algorithms of the scheduler. A thread that migrates to a distant logical core, however, might cause detrimental effects because of the latencies required to move and load the thread working set. The method 300 can depict migrating threads in terms of relative distance of their corresponding logical cores to help readily determine significant migration.

Instances of significant thread migration as well as thread affinity bugs that result in serialization of threads on a logical core, or the likelihood of such, can also be identified at 306 from processing the context switch data. The context switch data can be processed to determine factors such as relative distances of thread migrations, other thread migration at the same or about the same time, the proximity of idle logical cores to the migration, and other factors. Based on such factors and others, algorithms can determine likely instances of significant thread migration. The context switch data can also be processed to determine execution of two or more threads rapidly alternating on a logical core and the existence of concurrently idle logical cores, which can indicate likely instances of thread affinity bugs.

The method 300 generates a visualization 308 based on the analysis 306. In one example, the visualization 308 can take the form of graphical display depicting the channel segments. In one example, likely instances of significant thread migration or thread affinity bugs are specifically indicated along with the channel segments. The visualization can also classify statistics of thread migration to identify significant thread migration or of thread affinity to identify thread affinity bugs. A developer also can use the graphical display to identify other thread migration or affinity issues not specifically highlighted in the graphical display. Additional features can be included with the visualization 308 to allow the developer to gain a more detailed understanding of identified issues and to correct them. For example, regions of the graphical display can be magnified or provided with more resolution and additional details. Analysis and visualization 308 can be limited to specific regions of code. Also, the visualization 308 can be linked with application code such that issues identified on the graphical display can be readily addressed with modifications to the code. Some or all of these additional features, as well as others, can be included in the method or tool itself, or can be included with an IDE and integrated into the method.

Figure 4:
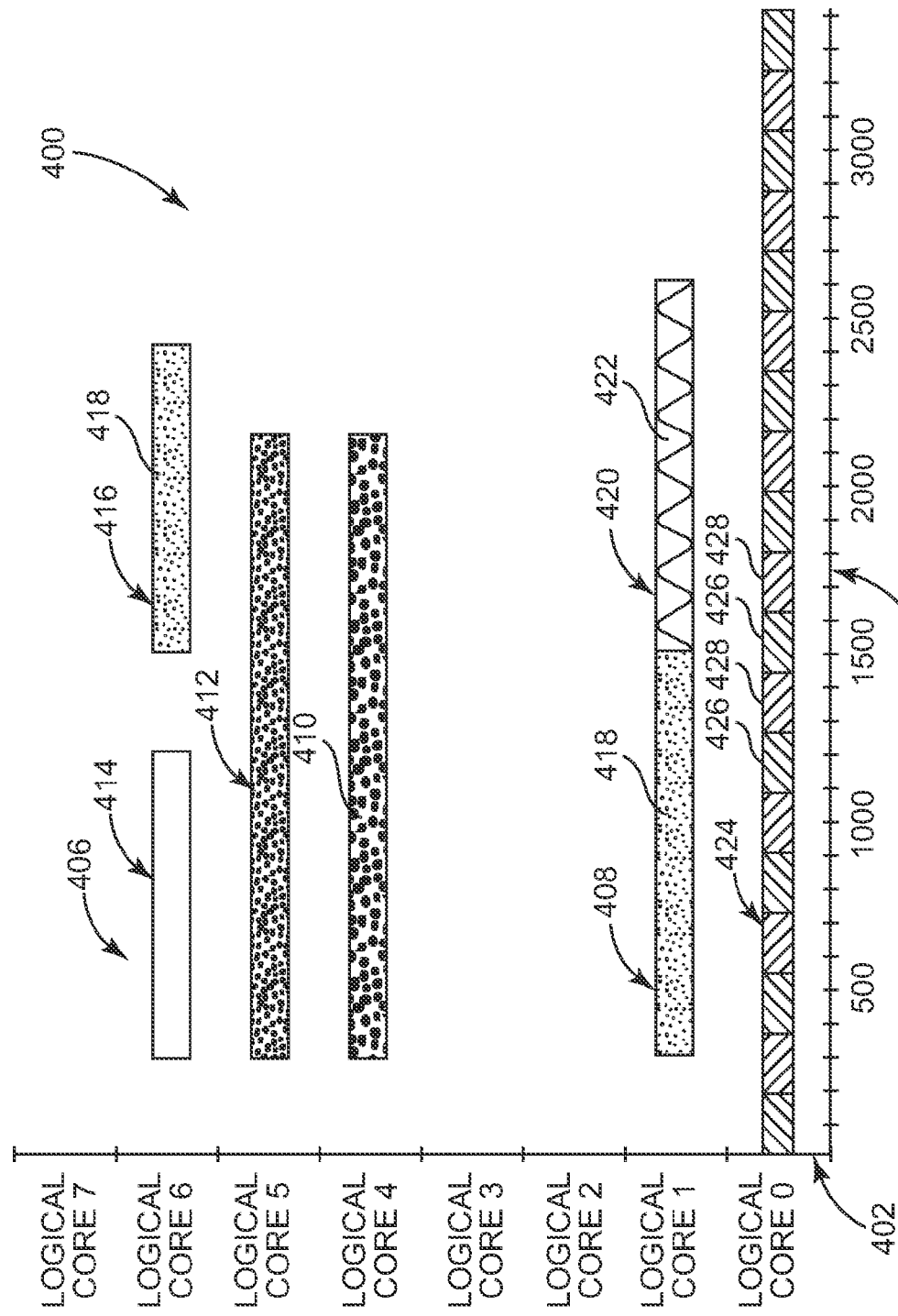
FIG. 4 is a schematic diagram illustrating an example output of the method of FIG. 3.

FIG. 4 illustrates an example graphical display 400 that can present channel segments. The graphical display indicates logical cores of the processor 200 along the y-axis 402 and time along the x-axis 404. Bars 406 represent executing threads. The location of the bars 406 relative to the scales on the axes 402, 404 represents the channel segments in this example. In the illustrated example, the scale along the x-axis 404 is time (in milliseconds), and the scale along the y-axis 402 is a logical core identifier for the logical cores in the computing device 100 available to process the concurrent application. The bars 406 can be assigned a mark, such as a color, pattern, or some other indicia to correspond with each thread and to distinguish the thread from other threads. The bars 406 are aligned with a logical core identified on the y-axis 402 to indicate the corresponding logical core executing the thread. The edges of the bars 406 correspond with the start and stop times, or pause and resume times as the case may be, of the thread in the context of the duration of the trace along the x-axis 404. Times not including bars 406 indicate that the corresponding logical core is idle.

The graphical display 400 depicts an example output of the method 300 applied to a concurrent application executed on the processor 200 for illustration. The y-axis 402 lists the eight logical cores available to execute the threads of the application, which are designated as logical core 0 through logical core 7. The logical cores can be listed along the y-axis 402 in a general order relative to their distances to each other's memory. For example, logical cores 0 and 1 might share the same physical core 204 and have relatively short distances to each other's memory, and so logical cores 0 and 1 are depicted as adjacent to each other. Logical cores 6 and 7 might also share the same physical core 210, so they are depicted as adjacent to each other, but they are opposite logical cores 0 and 1 on the scale the corresponding memories are a great distance from each other. Other features can be used or included to indicate core proximity. In one example, the listed cores are not necessarily evenly spaced from each other along the y-axis 402. Instead, the spacing can provide indication of relative distances of corresponding memory.

The example output of the graphical display 400 also illustrates that logical cores 1, 4, 5, and 6 are associated with bars 408, 410, 412 and 414, respectively. The bars 408, 410, 412, 414 each indicate a unique corresponding thread beginning execution on the corresponding logical core at about 300 milliseconds into the duration of the trace. Bars 410, 412, 414 indicate the corresponding threads execute and terminate without migration or thread affinity bugs.

Bar 408, together with bar 416, however, indicate a migrating thread 418. Bars 408 and 416 indicate the same thread by the similar indicia, or pattern, used to depict bars 408, 416. Bar 408 indicates thread 418 pauses, execution on logical core 1 at 1500 milliseconds into the duration of the trace. Bar 420, indicates thread 422 begins execution on logical core 1 after thread 418 pauses. Bar 416 indicates thread 418 resumes execution on logical core 6.

With the visualization 308, the developer can determine that thread 418 is moved a significant distance in the architecture, which can lead to a degradation in performance. The graphical display 400 also indicates that logical cores 2, 3 and 7 are also idle around the time of migration. In the example, the migration is not specifically indicated as a likely significant thread migration. Other examples could highlight this migration, use lines to call attention to the distance of migration, or the like, to help the developer readily identify the likely significant migration. The developer can use the visualization, as well as a link to the corresponding code around the migration point of the application, to determine if changes can be made to the code. For example, the code can be adjusted such to migrate thread to logical core 2 instead of 6 based on the proximity of memories in logical cores 1 and 2. In another possible adjustment, the developer can use thread affinity to force the scheduler to execute thread 418 on logical core 1 preventing migration.

Bar 424 depicts separate threads 426, 428 concurrently scheduled on logical core 0, which is indicative of a thread affinity bug. The scheduler is unable to move one or both threads 426, 428 to another logical core to improve concurrent performance even though other logical cores appear to be idle (e.g., logical core 2 and logical core 3). In the example, the affinity bug is not specifically indicated as a likely thread affinity bug. Other examples could highlight or otherwise call attention to this affinity bug, or the like, to help the developer readily identify the likely thread affinity bug. The developer can make an adjustment to the code to allow thread 426 and 428 to run on separate logical cores. Examples include removing an inadvertent thread affinity or forcing one of the threads to execute on an idle logical core.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer implemented method, comprising:
receiving information regarding a plurality of logical cores each having a corresponding memory in a multiple core processor;
receiving a plurality of context switch records generated by recording context switches developed from executing a plurality of threads in a concurrent application on the multiple core processor during a course of time;
generating a plurality of thread execution segments from the information and the context switch records, wherein each of the thread execution segments associates an instance of an executing thread on a corresponding logical core with respect to the course of time; and
presenting the plurality of thread execution segments in a visualization configured to indicate which thread is executing on which logical core over the course of time for each of the plurality of threads to display thread migration in the concurrent application, the logical cores arranged along an axis of the visualization relative to their distance to each other's memory.

2. The method of claim 1 wherein the plurality of context switch records are determined with an enabled trace conducted over a duration of the trace.

3. The method of claim 1 wherein the context switch records include context switch events.

4. The method of claim 1 wherein the context switch records include a timestamp, process identifier, thread identifier, and a logical core identifier for each of the plurality of threads.

5. The method of claim 1 wherein the information regarding the plurality of logical cores includes information regarding the architecture of the multiple core processor to indicate relative distances between the logical cores.

6. The method of claim 1 wherein generating a plurality of thread execution segments includes determining relevant times of execution for each thread and determining from the context switch records at least one corresponding logical core used to execute the thread.

7. The method of claim 6 wherein each thread execution segment is depicted with a channel segment indicating start and stop times of the corresponding thread, and further including pause and resume times in an executing thread migrating from one of the logical cores to another of the logical cores.

8. The method of claim 7 wherein the channel segments for each migrating thread depict which logical cores execute the migrating thread and the corresponding execution times during the course of time.

9. The method of claim 1 where in the visualization includes a graphical display.

10. The method of claim 9 wherein the graphical display includes a link to code of the application.

11. A computer readable storage medium, which does not include a transitory propagating signal, storing computer executable instructions for controlling a computing device to perform a method comprising:
receiving data relating to a plurality of logical cores in a multiple core processor, the logical cores each having a corresponding memory;
receiving a plurality of context switch records generated from recording context switches developed from executing a plurality of threads in a concurrent application on the plurality of logical cores during a course of time;
generating a plurality of thread execution segments from the data and the context switch records, wherein each of the thread execution segments associates an instance of an executing thread on a corresponding logical core with respect to the course of time; and
generating a graphical display with the plurality of thread execution segments, the graphical display indicating which thread is executing on which logical core over the course of time for each of the plurality of threads to display thread migration in the concurrent application, the logical cores arranged along an axis of the visualization relative to their distance to each other's memory.

12. The computer readable storage medium of claim 11 wherein data relating to the plurality of logical cores is received by causing an operating system on the computing device to interrogate the processing system.

13. The computer readable medium of claim 12 wherein the data relating to the plurality of logical cores includes data regarding logical cores available to execute the concurrent application and data regarding architecture information of the multiple processor core.

14. The computer readable medium of claim 13 wherein the data regarding architecture information is used to arrange a list of the logical cores on the graphical display.

15. The computer readable storage medium of claim 11 wherein a trace is enabled in the operating system to provide the plurality of context switch records.

16. The computer readable storage medium of claim 15 wherein the context switch records are related to thread context switches.

17. The computer readable storage medium of claim 16 wherein each context switch record includes a timestamp, process identifier, a thread identifier, a logical core identifier associated with the thread identifier, and data as to whether the thread is stopping or starting execution.

18. The computer readable storage medium of claim 11 wherein portions of the graphical display are linked to corresponding portions of code for the concurrent application.

19. A system comprising:
a processor;
a memory device storing instructions executable by the processor to:
receive data relating to the plurality of logical cores each having a corresponding memory, wherein the data includes data regarding logical cores available to execute a concurrent application and data regarding architecture information of the multiple processor core;
receive a plurality of context switch records generated from a trace recording context switches and developed from executing a plurality of threads in the concurrent application on the plurality of logical cores during a course of time;
generate a plurality of thread execution segments from the data and the context switch records, wherein each of the thread execution segments associates an instance of an executing thread on a corresponding logical core with respect to the course of time; and
generate a graphical display with the plurality of thread execution segments, wherein the graphical display lists the plurality of logical cores along an axis according to the data relating to distance to each other's memory with respect to the plurality of logical cores, wherein the course of time is indicated along a time axis, and wherein each of the thread execution segments is assigned a mark and depicted as at least one bar including the mark with relation to the logical cores along the axis and execution time along the time axis to identify thread migration or thread affinity bugs in the concurrent application.

20. The system of claim 19 configured to link additional details to portions of the graphical display, wherein the additional details include corresponding sections of application code available for modification.

* * * * *